United States Patent [19]
Dufour et al.

[11] Patent Number: 5,727,997
[45] Date of Patent: Mar. 17, 1998

[54] AUTOMATIC DEVICE FOR CUTTING THE LEGS OF PORK CARCASSES

[75] Inventors: Yvon Dufour, St-Anselme; Michel Martin, St Etienne de Lauzon; Yvon St-Onge, Quebec; Jocelyn Genest, Lévis; Jean-Guy Roy, St-Anselme, all of Canada

[73] Assignee: G. -E. LeBlanc Inc., St-Anselme, Canada

[21] Appl. No.: 800,516

[22] Filed: Feb. 14, 1997

[30] Foreign Application Priority Data

Dec. 5, 1996 [CA] Canada .................................. 2192227

[51] Int. Cl.$^6$ ................................................ A22B 5/20
[52] U.S. Cl. .......................... 452/170; 452/153; 452/160; 452/152; 83/367
[58] Field of Search ............................... 452/170, 152, 452/166, 160, 163, 154, 155, 149, 157, 156, 153; 83/72, 73, 75, 358, 360, 367

[56] References Cited

U.S. PATENT DOCUMENTS

| | | | |
|---|---|---|---|
| 4,562,613 | 1/1986 | Lewis | 452/160 |
| 4,935,990 | 6/1990 | Linnenbank | 452/169 |
| 5,295,896 | 3/1994 | Petersen | 452/171 |
| 5,391,109 | 2/1995 | Wadell | 452/170 |
| 5,494,480 | 2/1996 | Parsschier | 452/171 |

Primary Examiner—Willis Little
Attorney, Agent, or Firm—Robic

[57] ABSTRACT

An automatic device for cutting the legs of pork carcasses laying transversally onto a conveyor. A support carrier is mounted onto a frame extending close to the conveyor in such a manner as to be movable toward and away from the conveyor. The support carrier supports a circular saw extending in a vertical plane parallel to the moving direction of the conveyor at a sufficient height to cut the legs projecting away from the same. The support carrier also supports a device called "feeler" that is pivotably hung to a horizontal pivot at a predetermined distance from the saw, which corresponds to the average length for the legs to be cut. A control system is operatively connected to a presence sensor mounted in such a manner to detect the legs of the carcasses when these legs reach the feeler. The control system is also connected to a motion detector that detects any swing of the feeler, and to a power jack for moving the support carrier. The control system is actuated as soon as the presence sensor detects a leg, and it operates the power jack in order to move the support carrier towards the conveyor in order to bring this device in contact with the leg if this one is not already in contact with the same, or to move the device in the opposite direction to bring it out of contact with the detected leg if this leg is already in contact with it. Such a generated contact or lack of contact with the legs is detected by the motion detector which gives a signal for stopping the motion of the support carrier and, accordingly, of the saw which is then automatically positioned to cut the detected leg.

12 Claims, 5 Drawing Sheets

1

AUTOMATIC DEVICE FOR CUTTING THE LEGS OF PORK CARCASSES

BACKGROUND OF THE INVENTION a) Field of the Invention

The present invention relates to an automatic device for cutting the legs of pork carcasses laying transversally on a conveyor moving in a given direction.

b) Brief Description of the Prior Art

In the meat processing industry, and more particularly in the plants where the pork carcasses are cut into pieces, it is of common practice to cut each pork carcass along the vertebral spine, in order to obtain two half-carcasses, These half-carcasses are then taken by an operator and laid transversally onto a conveyor moving in a given direction in order to bring them to a first working unit where the ham portion of the pork is cut.

Before the ham portion is cut, it is also of common practice to cut the leg extending from the ham portion (this leg corresponds to the portion of the pork that extends from the knee and the nails of the animal). To do so, it is of common practice to position the half-carcasses onto the conveyor in such a manner that the legs project transversally away from the conveyor on one side of the same. An operator located upstream of the first working unit positions a saw when each of the half-carcasses passes in front of him, in order to cut the leg of the half-carcasses at a predetermined length. For this purpose the saw is mounted onto a support carrier that has been manually moved toward away from the conveyor. So far, cutting of the legs has always been carried out manually. This is a routine work, which makes it dangerous over the time.

SUMMARY OF THE INVENTION

The object of the present invention is to provide an automatic device for cutting the legs of pork carcasses laying transversally onto a conveyor moving toward the first working unit of a meat processing plant, wherein the ham portions are cut. This automatic device is intended to be substituted for the operator that presently manually the saw that is used for cutting the legs of the half-carcasses.

The automatic device according to the invention comprises:

a frame extending close to the conveyor on the one side thereof where the legs projects away;

a support carrier mounted onto the frame in such a manner as to be movable toward or away from the conveyor in a direction transverse to the conveyor, this support carrier having a free end located close to the conveyor;

a circular saw mounted on the free end of the support carrier, the saw extending in a vertical plane substantially parallel to the moving direction of the conveyor and at a sufficient height to cut the legs projecting away from the conveyor;

a device hereinafter called "feeler" that is vertically hung onto an horizontal pivot projecting from the support carrier at a predetermined distance from the free end of the same, the predetermined distance corresponding to the average length of the legs to be cut, the feeler extending upstream of the saw with respect to the moving direction of the conveyor and at sufficient height to be contacted by the legs to be cut when the conveyor moves the carcasses; and driving means for moving the support carrier together with the feeler and the saw mounted thereon toward or away from the conveyor.

A presence sensor is mounted in such a manner as to detect the legs of the carcasses laying onto the conveyor when these legs reach the feeler.

A motion detector is also provided for detecting any swing of the feeler about the horizontal pivot in one way or the other, such a swing occurring when the feeler in a vertical position is hurt by a leg or when the feeler in an inclined position under the pressure of a leg is released and swings back to the vertical position.

Last of all, a control system is operatively connected to the presence sensor, the motion detector and the driving means. This control system is being actuated when the presence sensor detects a leg and then operates the driving means either to move the feeler mounted onto the support carrier toward the conveyor in order to bring this feeler into contact with the detected leg if this one is not already in contact with the feeler, or to move the feeler in the opposite way in order to bring the feeler out of contact with the detected leg if this leg is already in contact with the feeler, such a generated contact or lack of contact with the leg being detected by the motion detector which gives a signal for stopping the motion of the support carrier and, accordingly, of the saw which is then automatically positioned to cut the detected leg.

In accordance with a preferred embodiment of the invention, the control system also comprises temporizing means for stopping the motion of the support carrier and the saw supported by the support carrier even if the positioning of the saw is not completed. Such a stopping is carried out for a period of time selected as a function of the speed of the conveyor, to make it sure that the leg which has been detected is completely cut.

The device according to the invention may also comprise at least one other presence sensor located downstream of the saw with respect to the motion direction of the conveyor for preventing reactuation of the control system as long as the leg that has been originally detected has not been cut.

The device according to the invention is very simple and efficient. It is not devised to take into account any variation in the length of the legs to be cut, since no means are provided for adjusting the distance between the feeler and the circular saw. However, from a practical standpoint, this distance can be selected so as to substantially correspond to the average length of the legs to be cut which, in an industrial plant, are substantially of the same length since most of the half carcasses are of the same size. This average length is usually in the range of 6 to 8 inches.

BRIEF DESCRIPTION OF THE DRAWINGS

The invention will be better understood upon reading of the following non-restrictive description of the preferred embodiment thereof, made with reference to the accompanying drawings in which.

DESCRIPTION OF A PREFERRED EMBODIMENT OF THE INVENTION

Figure 1:
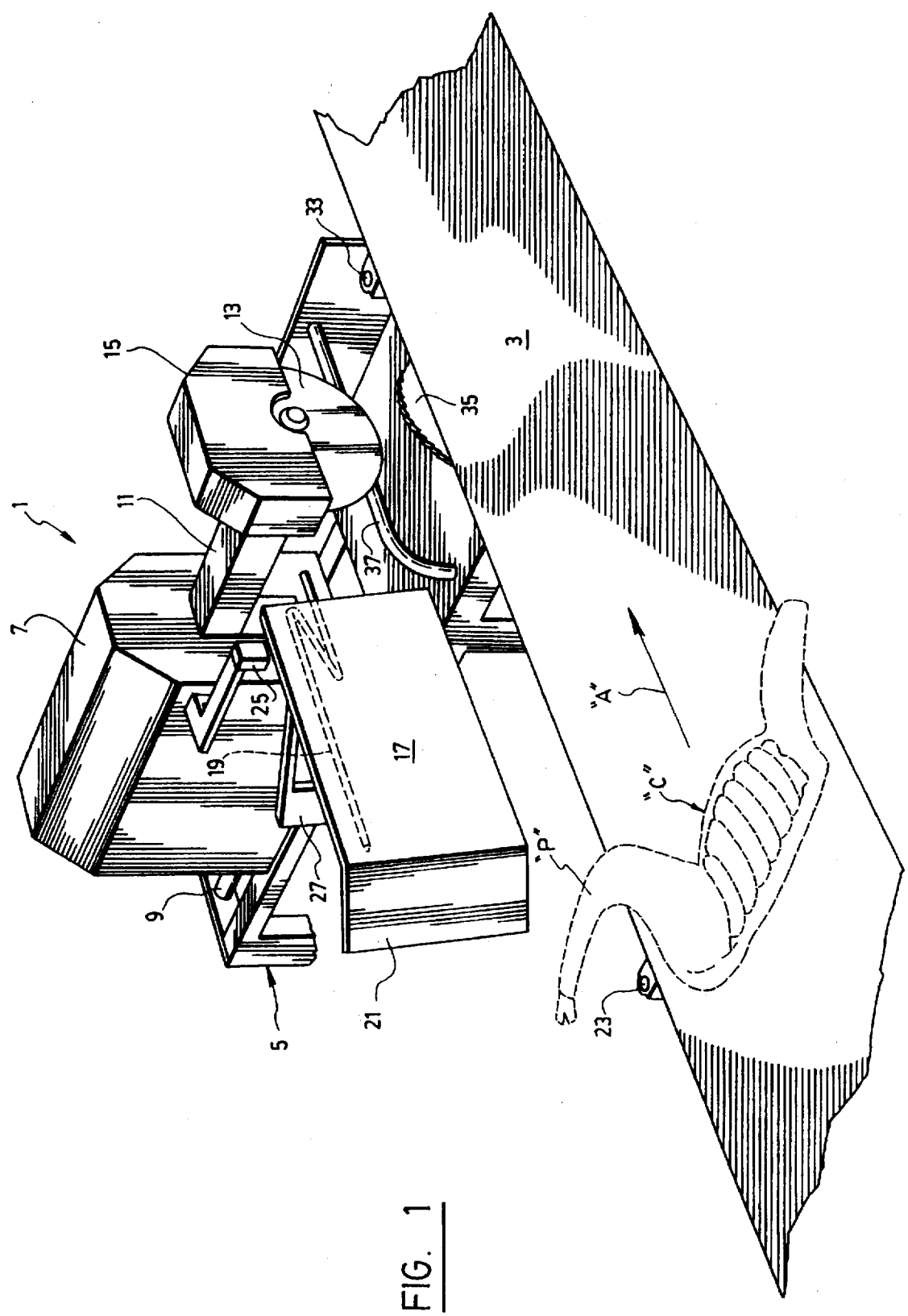
FIG. 1 is a perspective view of an automatic device for cutting the legs of pork carcasses, said device being shown in operating position close to a carcass conveyor.

The device 1 according to the invention as shown in the accompanying drawings is intended to be used for cutting the legs of pork carcasses C laying transversally onto a conveyor 3 moving in a given direction indicated by the arrow A. More precisely, the device 1 is devised to position itself automatically with respect to each of the legs P projecting away from the conveyor 3 on one side of it, in order to cut these legs to a given length.

The device 1 comprises a metal frame 5 located near the conveyor 3 on the one side of it where the legs project outwardly. A support carrier 7 is mounted onto the frame in such a manner as to move in one way and in the other in a direction indicated by the arrow B, transverse to the conveyor (see FIGS. 2 and 4). For this purpose, the support carrier 7 can be mounted on rails 9 forming an integral part of the frame, or on any other means that would permit to the same to move in the direction shown by the arrow B.

The support carrier 7 comprises a rigid arm having a free end located close to the conveyor 3. A circular saw is mounted on the free end of the arm 11. This saw has its upper part covered by a protecting hood 15. It extends in a vertical plane substantially parallel to the moving direction A of the conveyor. By properly selecting the height of the frame 5, this saw 13 extends also at a sufficient height to cut the legs P projecting away from the conveyor.

In practice, the motor of the saw can be mounted onto the support frame 7. Driving of the saw is then carried out by means of a shaft (not shown) extending within the arm 11.

A device that preferably but not exclusively consists of a long rigid plate 17 hereinafter called "feeler", is hung vertically onto an horizontal pivot 19 which is fixed onto the support carrier 7. In such a position, the feeler 17 is at a predetermined distance d (see FIG. 4) of the free end of the arm 11, and, accordingly, of the saw. This length d is selected to substantially corresponds to the average length of the legs to be cut. In practice, this distance d can range from 6 to 8 inches, according to the average size of the porks whose carcasses are processed. As is clearly shown in the drawings, the feeler 17 extends upstream of the saw 13 with respect to the moving direction A of the conveyor 3. The feeler 17 extends also at a sufficient height to be contacted by the legs P to be cut when the conveyor moves the carcasses C in the direction A. Advantageously, the front edge 21 of the feeler 17 is slightly folded at an angle to facilitate the first contact with the leg P when this leg reaches the feeler.

A presence sensor 23 is located close to the conveyor substantially at the level of the front edge 21 of the feeler 17 in order to detect the legs P of the carcasses laying on the conveyor when these legs reached the feeler 17. This sensor 23 may consist of a photoelectric cell located slightly under the level of the conveyor, the cell being oriented upwardly in order to detect the presence of the legs when they move above the same.

A motion detector 25 is mounted onto the support carrier above the upper edge of the feeler 17 for detecting any swing of the same in one way or the other about the horizontal pivot 19 to which it is hung. Such a swing occurs when the feeler in vertical position is hurt by a leg or when the feeler in an inclined position under the pressure of the leg already in contact with the same is released and swing back to the vertical position (see the positions of the feeler indicated in full and dotted lines in FIG. 2 of the drawings). The motion detector 25 may consist of a photoelectric switch or any similar device.

In order to hold the feeler in vertical position while allowing the same to swing about its pivot axis, a counterweight 27 can be attached to the feeler. Alternatively, a return spring can be incorporated to the pivot 19.

Driving means are provided for moving the support carrier 7 together with the feeler 17 and the saw 13 mounted thereon toward or away from the conveyor, in the direction indicated by the arrow B. The driving means preferably consists of a hydraulic jack 29 operated in one way or the other by means of a direction control (not shown). This jack has one end fixed to the frame 5 and the other one to the support carrier 7 as is clearly shown in FIG. 2. Of course, it should be understood that any other driving means permitting to move the support carrier in the direction shown with the arrow could also be used. By way of example, such other driving means could be a linear electric actuator.

Figure 5:
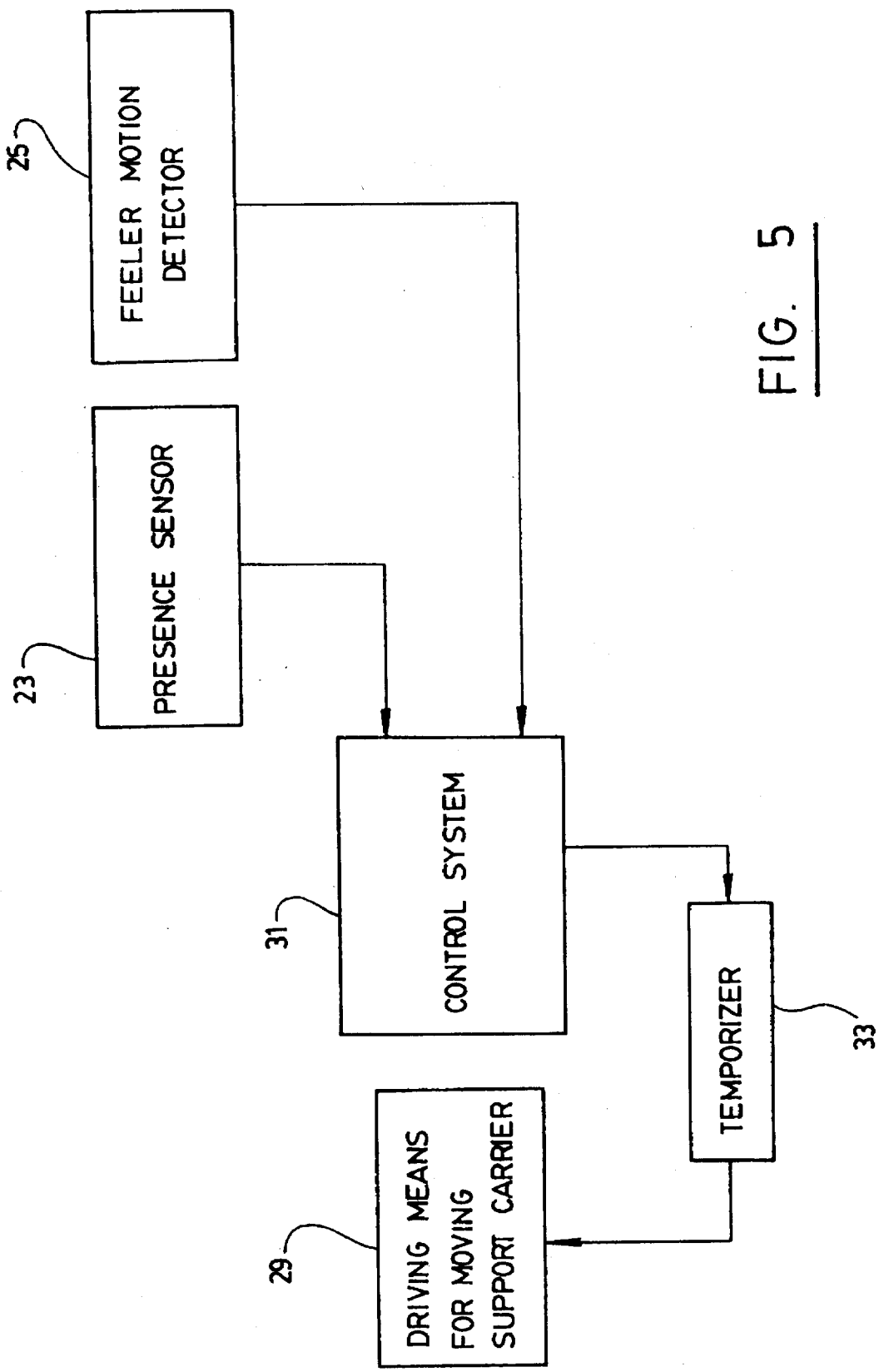
FIG. 5 is a schematic view of the control system of the illustrated device.

A control system 31 (see FIG. 5) is operatively connected to the presence sensor 23, the motion detector 25 and the driving means 29. This control system is preferably electric and devised to allow for a manual actuation of the support carrier and of the saw supported by the same in the case of a power failure. The control system is actuated as soon the presence sensor 25 has detected a leg P. It operates the driving means 29 in order to move the same together with the feeler 17 towards the conveyor in order to bring the feeler 17 into contact with the detected leg if this leg is not in contact with the feeler. Alternatively, the control system operates the driving means 29 for moving the support carrier in the opposite direction in order to bring the feeler 17 out of the contact with the leg which has just been detected, if this leg is already in contact with the feeler and has swung the same. The so-generated contact or lack of contact with the legs is detected by the motion detector which gives a signal for stopping motion of the support carrier and of the saw which is then automatically positioned to cut the detected legs at a predetermined length d.

As can be understood, the nails of the pork at the end of the leg push and thus actuate the feeler 17 which, via the control system, "instruct" the saw to move transversally to the conveyor in order to get closer or move back from the leg in order to cut it to the predetermined length, which is usually of 6 to 8 inches.

In other words, when the leg or the carcass with the leg passes above the presence sensor, this sensor actuates the control system. If the feeler is not yet actuated by the leg, the saw moves towards the conveyor until the feeler contacts the leg. On the contrary, if the presence sensor indicates the presence of leg and the feeler is, at the same time, also actuated, viz. pushed in the inclined position shown in dotted lines in FIG. 2) by the leg, then the saw is moved back until the feeler is no more swung.

A temporizer 33 (see FIG. 5) can be provided for stopping the motion of the support carrier and thus ensure that the saw does not move any more when the detected leg is being cut, even if the feeler still indicates that the support carrier should be moved in one way or the other. This temporizer can be adjusted to stop the carrier for a period of time selected as a function of the speed of the conveyor, to make it sure that the leg which has been detected is completely cut.

Advantageously, another presence sensor can be provided close to the conveyor downstream of the saw in order to prevent reactuation of the control system as long as the last leg that has been detected, has not been cut. This avoids undue back and fro movement of the support carrier, the saw and the feeler in the cases where several carcasses would lay in very close position to each other onto the conveyor 3.

As can now be understood, the support carrier, the saw and the feeler all together form a unit. They move in unison in one way and the other in a direction transverse to the conveyor.

The length of the plate forming the feeler 17 determines the maximum period of time required to obtain proper adjustment of the position of the carrier. It is worth mentioning that the length of this plate should be selected as of a function of the normal speed of motion of the conveyor and the conventional spacing that is given to the carcasses laid onto the same.

Figure 2:
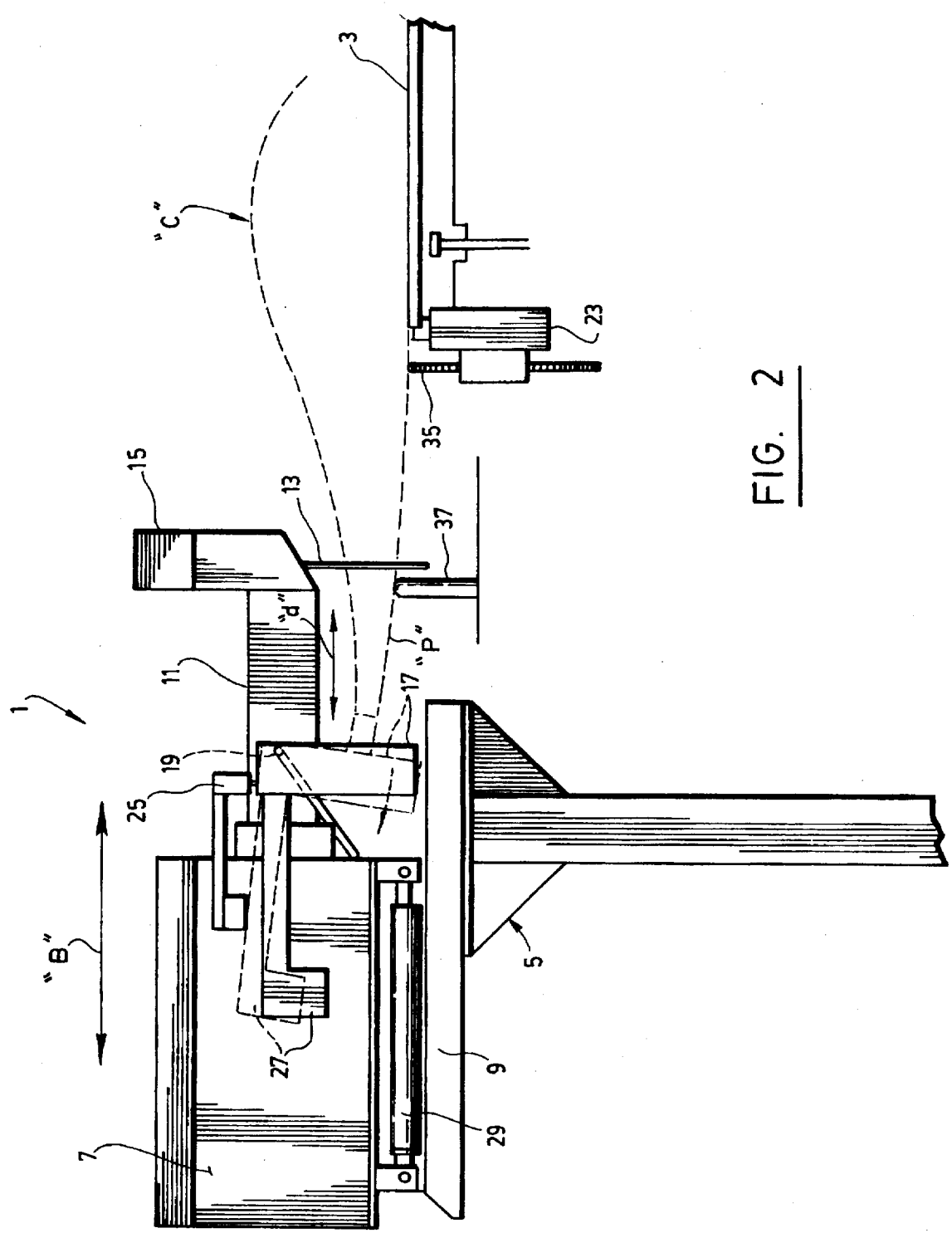
FIG. 2 is a front elevational view of the device shown in FIG. 1.
Figure 3:
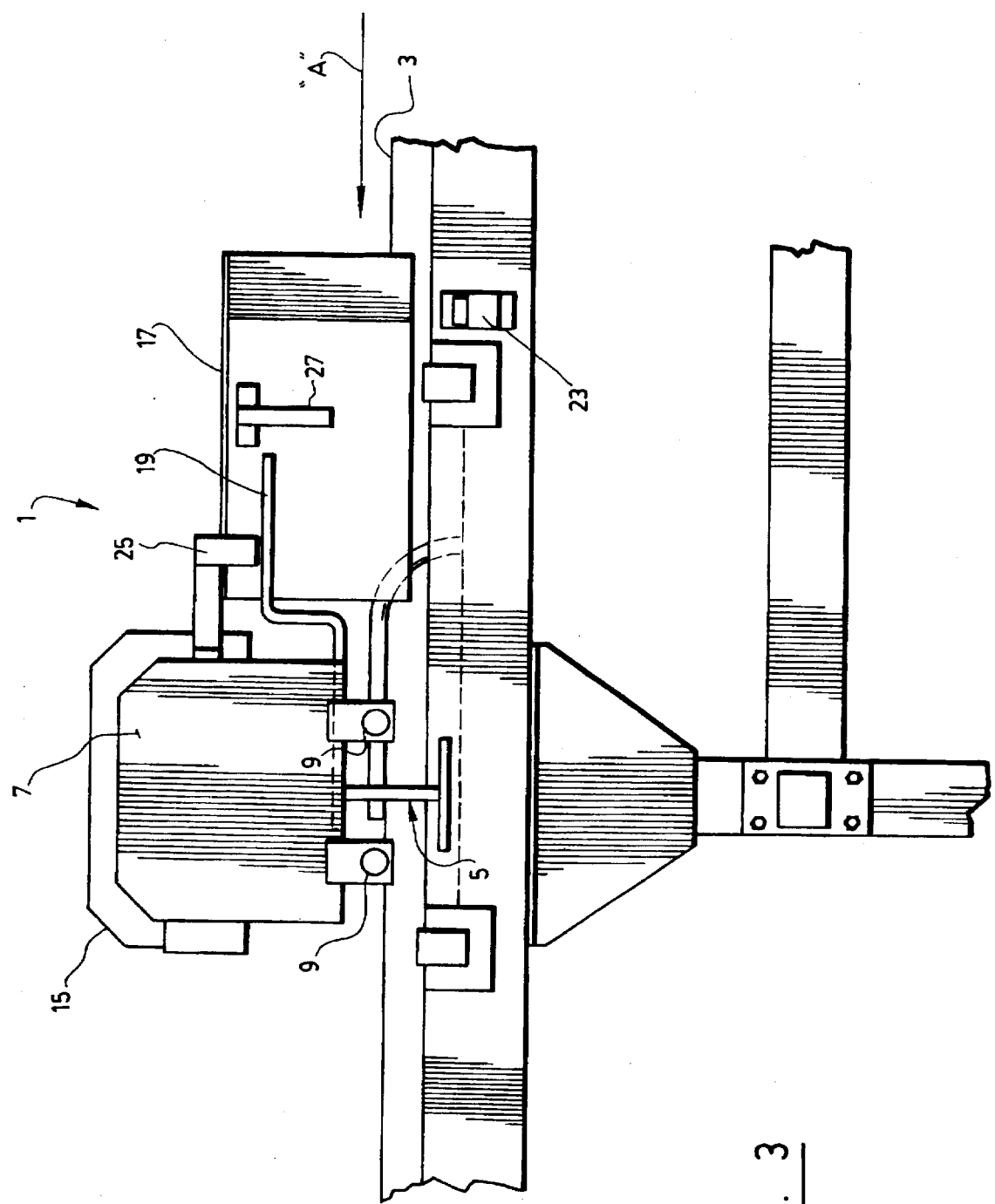
FIG. 3 is a side elevational view of the device shown in FIG. 1, opposite to the conveyor.
Figure 4:
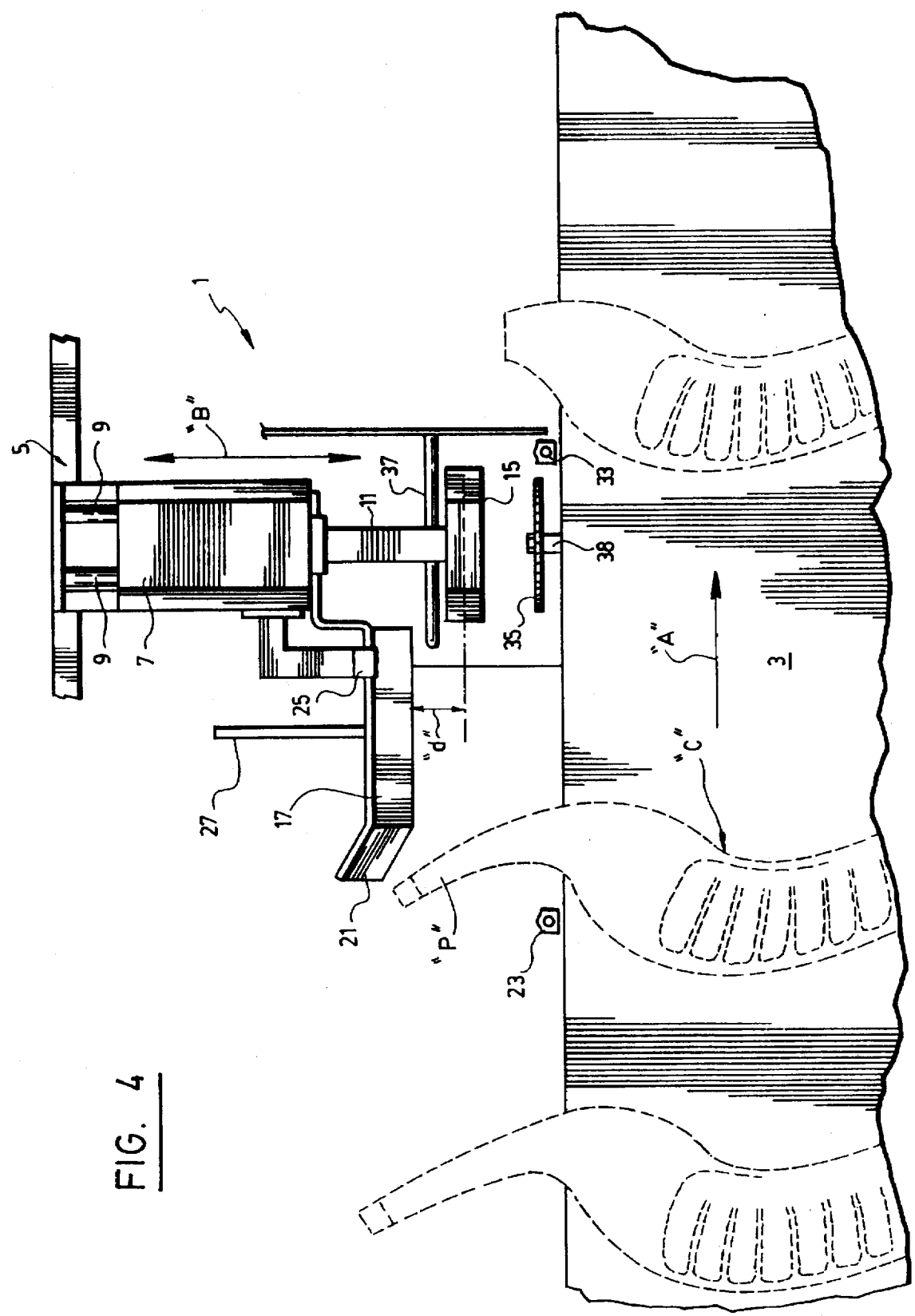
FIG. 4 is a top plan of view of the device shown in FIG. 1.

As is shown in FIGS. 1, 2 and 4, a toothed-wheel 35 can be mounted on the one side of the conveyor 3 in order to be driven at the same radial speed as the same via a shaft 38. This toothed-wheel is mounted in such a manner as to extend under the conveyor substantially as the same level at the saw 13 for, on the one hand, driving and, on the other hand, slightly lifting the legs P of the carcasses C in order to facilitate cutting of these legs by the saw. For this purpose, a supporting arch-shaped bar 37 can be provided onto the frame supporting the device according to the invention, for lifting up and maintaining the leg P when this one is being cut by the saw 13.

As can be appreciated, the device according to the invention permits to position in an automatic and very simple manner the saw for cutting the legs of pork carcasses moving onto conveyor toward an ham cutting unit. This device carries out the routine work that is presently carried out manually.

In the previous description, reference has been made exclusively to pork carcasses. However, it can be understood that the very same device could be used in the meat processing industry for cutting legs or segments of carcasses of any other kind of animal carcasses laid in the same way onto a conveyor moving in a given direction.

We claim:

1. An automatic device for cutting the legs of pork carcasses laying transversally on a conveyor moving in a given direction, said legs projecting away from said conveyor on one side thereof, said device comprising:

a frame extending close to the conveyor on the one side thereof where the legs projects away;

a support carrier mounted onto the frame in such a manner as to be movable toward or away from the conveyor in a direction transverse to said conveyor, said support carrier having a free end located close to the conveyor;

a circular saw mounted on the free end of the support carrier, said saw extending in a vertical plane substantially parallel to the moving direction of the conveyor and at a sufficient height to cut the legs projecting away from said conveyor;

a feeler vertically hung onto a horizontal pivot projecting from the support carrier at a predetermined distance from the free end of the same, said predetermined distance corresponding to the average length of the legs to be cut, said feeler extending upstream of the saw with respect to the moving direction of the conveyor and at sufficient height to be contacted by the legs to be cut when the conveyor moves the carcasses;

a presence sensor mounted in such a manner as to detect the legs of the carcasses laying onto the conveyor when these legs reach the feeler;

a motion detector for detecting any swing of the feeler about the horizontal pivot in one way or the other, such a swing occurring when the feeler in a vertical position is hurt by a leg or when the feeler in an inclined position under the pressure of a leg is released and swings back to the vertical position;

driving means for moving the support carrier together with the feeler and the saw mounted thereon toward or away from the conveyor; and a control system operatively connected to the presence sensor, the motion detector and the driving means, said control system being actuated when the presence sensor detects a leg and operating the driving means either to move the feeler mounted onto the support carrier toward the conveyor in order to bring this feeler into contact with the detected leg if this one is not already in contact with the feeler, or to move the feeler in the opposite way in order to bring the feeler out of contact with the detected leg if this leg is already in contact with the feeler, such a generated contact or lack of contact with the leg being detected by the motion detector which gives a signal for stopping the motion of the support carrier and, accordingly, of the saw which is then automatically positioned to cut the detected leg.

2. The device of claim 1, wherein the control system also comprises temporizing means for stopping the motion of the support carrier and the saw supported by said support carrier even if the positioning of the saw is not completed, for a period of time selected as a function of the speed of the conveyor, to make it sure that the leg which has been detected, is completely cut.

3. The device of claim 1, wherein the driving means of the support carrier consists of a hydraulic jack operated in one way and the other by means of a direction control.

4. The device of claim 1, wherein the driving means of the support carrier consists of an electric linear actuator.

5. The device of claim 1, wherein the presence sensor consists of a photoelectric cell.

6. The device of claim 1, wherein the motion detector of the feeler consists of a photoelectric switch.

7. The device of claim 1, further comprising at least one other presence sensor located downstream of the saw with respect to the motion direction of the conveyor for preventing reactuation of the control system as long as the leg that has been originally detected, has not been cut.

8. The device of claim 1, wherein the control system is electric and devised to permit a manual actuation of the support carrier and of the saw supported by said support carrier in the case of a power failure.

9. The device of claim 1, further comprising at least one toothed wheel mounted onto the conveyor so as to be driven at the same radial speed as the same, said toothed wheel being positioned adjacent to the conveyor substantially at the same level as the saw for, on the one hand, driving and, on the other hand, slightly lifting up the legs of the carcasses to facilitate cutting of said legs by the saw.

10. The device of claim 2, wherein:

the presence sensor consists of a photoelectric cell;

the motion detector of the feeler consists of a photoelectric switch; and the control system is electric and devised to permit a manual actuation of the support carrier and of the saw supported by said support carrier in the case of a power failure.

11. The device of claim 10, wherein the driving means of the support carrier consists of a hydraulic jack operated in one way and the other by means of a direction control.

12. The device of claim 10, wherein the driving means of the support carrier consists of an electric linear actuator.

* * * * *